(12) United States Patent
Baynes et al.

(10) Patent No.: US 11,087,132 B2
(45) Date of Patent: Aug. 10, 2021

(54) SYSTEMS AND METHODS FOR MAPPING EMERGED PLANTS

(71) Applicant: Precision Hawk USA, Inc., Raleigh, NC (US)

(72) Inventors: Jeremy Baynes, Raleigh, NC (US); Ali Punjani, Raleigh, NC (US); Edgar Lobaton, Raleigh, NC (US); Jason San Souci, Raleigh, NC (US); Thomas Haun, Raleigh, NC (US); Pat Lohman, Raleigh, NC (US); Andrew Slater, Raleigh, NC (US); Matt Mead, Raleigh, NC (US)

(73) Assignee: Precision Hawk USA, Inc., Raleigh, NC (US)

( * ) Notice: Subject to any disclaimer, the term of this patent is extended or adjusted under 35 U.S.C. 154(b) by 19 days.

(21) Appl. No.: 16/331,010

(22) PCT Filed: Sep. 7, 2016

(86) PCT No.: PCT/US2016/050472
§ 371 (c)(1),
(2) Date: Mar. 6, 2019

(87) PCT Pub. No.: WO2018/048387
PCT Pub. Date: Mar. 15, 2018

(65) Prior Publication Data
US 2019/0258859 A1 Aug. 22, 2019

(51) Int. Cl.
*G06K 9/00* (2006.01)
*A01C 21/00* (2006.01)
(Continued)

(52) U.S. Cl.
CPC ......... *G06K 9/00657* (2013.01); *A01B 49/06* (2013.01); *A01B 79/005* (2013.01);
(Continued)

(58) Field of Classification Search
None
See application file for complete search history.

(56) References Cited

U.S. PATENT DOCUMENTS

| 6,694,064 B1 * | 2/2004 | Benkelman .......... G06K 9/0063 348/144 |
| 2014/0107957 A1 | 4/2014 | Lindores et al. |

(Continued)

FOREIGN PATENT DOCUMENTS

| WO | 2014147041 A1 | 9/2014 |
| WO | 2014147043 A1 | 9/2014 |
| WO | WO-2014147041 A1 * | 9/2014 ......... G06K 9/00657 |

OTHER PUBLICATIONS

International Preliminary Report on Patentability for International Patent Application No. PCT/US2016/050472, dated Mar. 21, 2019, 9 pages.

(Continued)

*Primary Examiner* — Delomia L Gilliard
(74) *Attorney, Agent, or Firm* — Withrow & Terranova, PLLC (57) ABSTRACT

A system uses an optical sensor and an image processing apparatus to map emerged plants in a field. The optical sensor collects at least one image of a field of emerged plants. The image processing apparatus analyzes the image to detect areas of vegetation and creates a vegetation map indicative of the detected areas. The image processing element then analyzes the vegetation map to identify emerged plants within the image and creates at least map indicating locations of the emerged plants in the field. Such map may be used to make efficient crop management decisions based on the actual layout of emerged plants in the field.

22 Claims, 8 Drawing Sheets

(51) Int. Cl.
*A01G 25/16* (2006.01)
*G06T 3/40* (2006.01)
*A01B 49/06* (2006.01)
*A01B 79/00* (2006.01)
*G05B 15/02* (2006.01)
*G06Q 10/06* (2012.01)
*G06Q 50/02* (2012.01)

(52) U.S. Cl.
CPC ............ *A01C 21/005* (2013.01); *A01G 25/16* (2013.01); *G06T 3/4038* (2013.01); *G05B 15/02* (2013.01); *G06Q 10/063* (2013.01); *G06Q 50/02* (2013.01); *G06T 2207/20221* (2013.01)

(56) References Cited

U.S. PATENT DOCUMENTS

| | | | |
|---|---|---|---|
| 2014/0316614 A1 | 10/2014 | Newman | |
| 2015/0379702 A1* | 12/2015 | Ulman | H04N 5/332 348/207.1 |
| 2016/0050840 A1* | 2/2016 | Sauder | G06K 9/00657 701/3 |

OTHER PUBLICATIONS

International Search Report and Written Opinion for International Patent Application No. PCT/US2016/050472, dated Nov. 29, 2016, 9 pages.

\* cited by examiner

SYSTEMS AND METHODS FOR MAPPING EMERGED PLANTS

This application is a 35 U.S.C. § 371 national phase filing of International Application No. PCT/US2016/050472, filed Sep. 7, 2016, the disclosure of which is incorporated herein by reference in its entirety.

RELATED ART

Detailed information about planted crops helps farmers to make efficient and cost-effective management decisions. To assist farmers in gathering more information about crops, systems have been developed to automatically determine and record the locations where seeds are planted. For example, as a farmer is using a tractor to plant seeds in a field, an on-board controller may determine when a seed has been planted and then use a global positioning system (GPS) or other type of sensor to determine the approximate location of the planted seed. Using such information collected at the time of planting, the controller can generate an as-planted map that indicates the number of seeds planted in various regions of the field.

Having access to the as-planted map provides a farmer with various advantages. As an example, a farmer may use the as-planted map to efficiently determine the amount of fertilizer or water to be applied to a certain region of the field. If one region has a fewer number of seeds per acre relative to another region, then the farmer may decide to apply less fertilizer or water.

Although such an as-planted map accurately reflects the crop layout of a field at the time of planting, conditions of the crop may change over time such that the as-planted map no longer accurately indicates the layout of crops in certain areas of the field. As an example, some of the seeds may never germinate to form an emerged plant (e.g., a region of the field may be flooded thereby washing away some of the seeds) and some of the plants may die shortly after germination due to flooding, drought, pesticides, or other reasons. As a result, by relying on the as-planted map after a significant change in crop layout since planting, a farmer might make at least some inefficient crop management decisions.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Further, like reference numerals designate corresponding parts throughout the several views.

DETAILED DESCRIPTION

The present disclosure generally pertains to systems and methods for mapping emerged plants. A system in accordance with one embodiment of the present disclosure comprises an optical sensor that configured to capture at least one image of a field of emerged plants. As an example, the optical sensor may be coupled to an unmanned aerial vehicle (UAV) that is controlled to fly over a field as the optical sensor captures images of the field. In some cases, multiple images of the field are combined (e.g., stitched) in order to form a composite image that can be analyzed to determine the number and locations of emerged plants in the field. In this regard, an image processing apparatus receives image data from the optical sensor and detects areas of vegetation within an image of the field. Based on detected patterns of vegetation within the image, the image processing apparatus identifies emerged plants and creates at least one map indicating the location of each emerged plant identified within the field. Information from the map may be used to make more efficient crop management decisions as may be desired.

Figure 1:
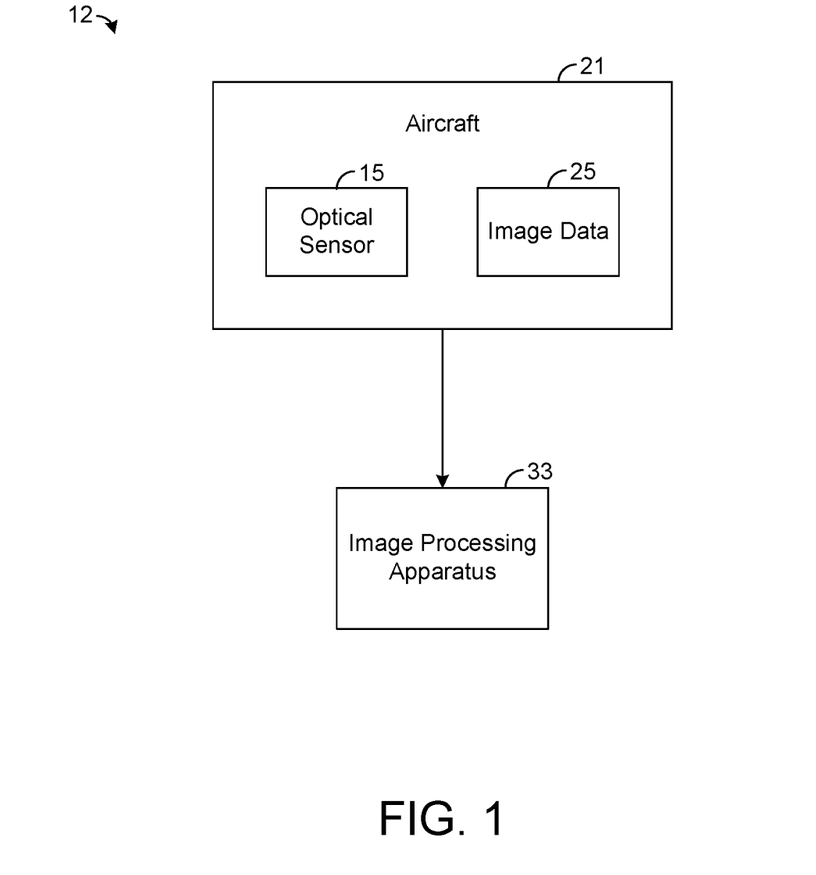
FIG. 1 is a block diagram illustrating an embodiment of a system for mapping emerged plants.

FIG. 1 depicts an exemplary system 12 for mapping emerged plants in a field. System 12 comprises an optical sensor 15, such as a camera, for capturing images of scene. In some embodiments, the optical sensor 15 is implemented as a video camera that is capable of capturing frames of video data, but other types of optical sensors are possible in other embodiments. As shown by FIG. 1, the optical sensor 15 may be mounted on or otherwise coupled to an aircraft 21, such as an unmanned aerial vehicle (UAV), but the optical sensor 15 may be coupled to other types of equipment or objects, such as a satellite, in other embodiments.

The aircraft 21 is controlled to fly to a field of emerged plants where the optical sensor 15 captures one or more of images of the field. In this regard, when the aircraft 21 is a UAV, the aircraft 21 may be configured to autonomously fly a pre-programmed path or pattern over a field of emerged plants while the optical sensor 15 captures images of the field. The path or pattern may be defined such that each emerged plant within the field is imaged by the optical sensor 15. In other embodiments, the path of the aircraft 21 may be controlled in a different manner. As an example, the aircraft 21 may be piloted by a human using remote control (when the aircraft 21 is UAV) or using on-board control inputs (when the pilot is on board the aircraft).

Image data 25 defining one or more captured images is transmitted to an image processing apparatus 33. The image processing apparatus 33 may comprise a computing unit, such as a handheld, laptop, desktop, or mainframe computer, that is configured to process the image data 25 in order to identify emerged plants within the captured images, as will be described in more detail hereafter. As an example, the image processing element 33 may be configured to provide one or more maps of the field indicating the locations or concentrations of the emerged plants that have been identified by the image processing apparatus 33.

In the embodiment depicted by FIG. 1, the image processing apparatus 33 does not reside on board the aircraft 21. In such an embodiment, the image data 25 may be wirelessly transmitted to the image processing apparatus 33 using radio frequency (RF) or other types of signals. It is also possible for the image data 25 to be communicated to the image processing apparatus 33 using a network, such as the Internet. As an example, the aircraft 21 may be equipped with a cellular radio that uses a cellular network for accessing the Internet in order to communicate the image data 25 to the image processing apparatus 33. It is also possible for the image processing apparatus 33 to be physically interfaced with the aircraft 21 after the image data 25 is acquired in order to download the image data 25 to the image processing apparatus 33. In addition, it is possible for the image processing apparatus 33 or at least portions of the image processing apparatus 33 to be located on the aircraft 21 such that wireless communication of the image data 25 is unnecessary. In other embodiments, yet other configurations and techniques for communicating the image data 25 to the image processing apparatus 33 are possible.

Figure 2:
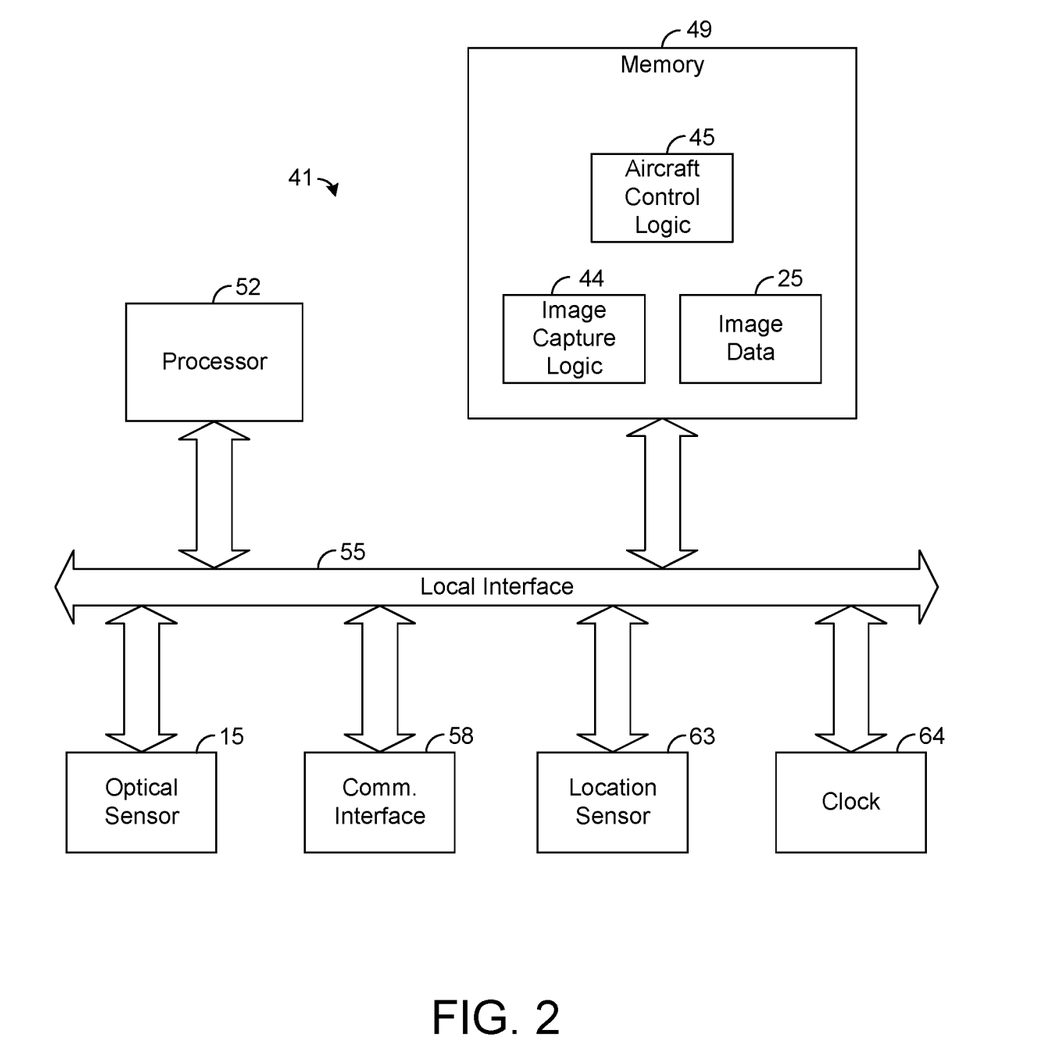
FIG. 2 is a block diagram illustrating an embodiment of a control system for an aircraft, such as is depicted in FIG. 1.

FIG. 2 depicts an exemplary embodiment of a control system 41 mounted on the aircraft 21 for controlling operational aspects of the aircraft 21, such as image capture and flight. As shown by FIG. 2, the control system 41 comprises image capture logic 44 for generally controlling image capture and aircraft control logic 45 for generally controlling other operational aspects of the aircraft 21. As an example, the aircraft control logic 45 may provide control inputs for controlling flight control components (not specifically shown) of the aircraft 21, such as one or more ailerons, rudders, flaps, elevators, propellers, or other components that may be used to control the aircraft's flight. The image capture logic 44 and/or the aircraft control logic 45 can be implemented in software, hardware, firmware, or any combination thereof. In the exemplary embodiment shown by FIG. 2, the image capture logic 44 and the aircraft control logic 45 are implemented in software and stored in memory 49.

Note that the image capture logic 44 and the aircraft control logic 45, when implemented in software, can be stored and transported on any computer readable medium for use by or in connection with a processor that can fetch and execute instructions. In the context of this document, a "computer-readable medium" can be any means that can contain or store a computer program for use by or in connection with a processor.

The exemplary control system 41 depicted by FIG. 2 comprises at least one conventional processor 52, such as a digital signal processor (DSP) or central processing unit (CPU), that communicates to and drives the other elements within the system 41 via a local interface 55, which can include at least one bus. Furthermore, the control system 41 comprises a communication interface 58, such as a radio frequency (RF) or cellular radio or modem, for permitting the system 41 to communicate with other systems or devices, such as the image processing apparatus 33. The system 41 also comprises a location sensor 63, such as a global positioning system (GPS) receiver, for sensing the aircraft's location. In addition, the system 41 further comprises a clock 64 that may be used to track time.

As the aircraft 21 is flying over a field of interest, the optical sensor 15 operating under the direction and control of the image capture logic 44 is configured to capture one or more images of the field. In some embodiments, the image capture logic 44 uses information from the location sensor 63 to control the optical sensor 15 in order to ensure that the optical sensor 15 captures at least one image of each region of interest within the field. The image capture logic 44 may be configured to tag or otherwise associate each image with metadata from the location sensor 63 indicating the geographic region of the optical sensor 15 at the time of image capture. The image capture logic 44 may also be configured to tag or otherwise associate each image with metadata from the clock 64 (e.g., a timestamp) indicating the time and date that the image was captured by the optical sensor 15.

The resolution of the images is preferably sufficient for enabling the image processing apparatus 33 to identify individual plants within the images, as will be described in more detail hereafter. In one exemplary embodiment, the resolution is at least 2.5 centimeters (cm) per pixel or better for the altitude at which the images are captured. That is, each pixel represents an area on the ground of at least 2.5 cm or smaller. However, in other embodiments, other resolutions are possible.

Figure 3:
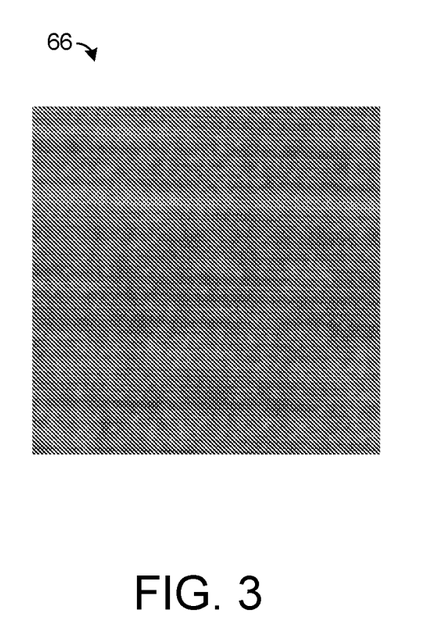
FIG. 3 shows an exemplary image of a field.

After the optical sensor 15 has captured images of the field, the image capture logic 44 is configured to combine the images into a composite image of the field or at least the areas of interest within the field. As an example, using the location information within the image metadata, the image capture logic 44 may use a conventional stitching algorithm in order to combine a plurality of images into a single composite image of the field. FIG. 3 shows an exemplary composite image 66 of a field that has crops planted in generally parallel rows as is typical for many types of crops. The rows generally appear as dark line segments separated by areas of a lighter color representing soil. Note that the image 66 is defined by a plurality of pixels, where each pixel corresponds to a respective geographic area of the imaged field. For each pixel, the optical sensor 15 detects a color of light from the corresponding geographic area and provides a color value indicative of the detected color. Such color value may have multiple color components, as is known in the art, such as a red component, a green component, and a blue component. In other embodiments, other types of color values may be used.

After an image of the field is captured and processed by the image capture logic 44 as may be desired, the image capture logic 44 is configured to communicate the image data 25 defining the captured image to the image processing apparatus 33, which is configured to process the image data 25 for identifying emerged plants within the image as will be described in more detail below. As an example, the image capture logic 44 may transmit image data 25 defining the composite image 66 described above to the image processing apparatus 33 using the communication interface 58 (FIG. 2), but other techniques for providing the image processing apparatus 33 with access to the image data 25 are possible.

Figure 4:
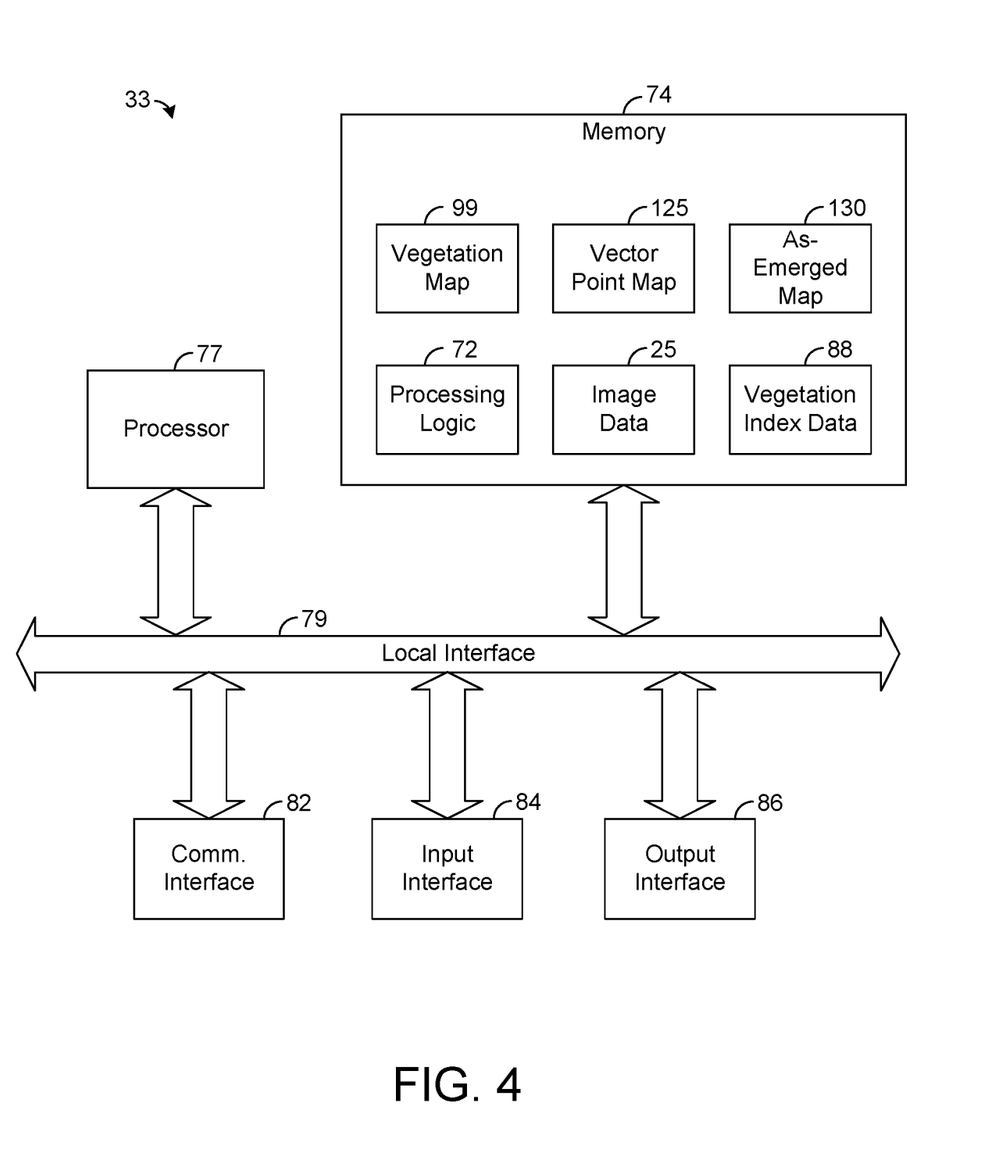
FIG. 4 is a block diagram illustrating an embodiment of an image processing apparatus, such as is depicted in FIG. 1.

FIG. 4 depicts an exemplary embodiment of the image processing apparatus 33. As shown by FIG. 4, the image processing apparatus 33 comprises processing logic 72 for controlling the operation of the apparatus 33, as will be described in more detail below. The processing logic 72 can be implemented in software, hardware, firmware, or any combination thereof. In the exemplary embodiment shown by FIG. 4, the processing logic 72 is implemented in software and stored in memory 74. Note that the processing logic 72, when implemented in software, can be stored and transported on any computer readable medium for use by or in connection with a processor that can fetch and execute instructions.

The exemplary image processing apparatus 33 depicted by FIG. 4 comprises at least one conventional processor 77, such as a digital signal processor (DSP) or central processing unit (CPU), that communicates to and drives the other elements within the image processing apparatus 33 via a local interface 79, which can include at least one bus. Furthermore, the image processing apparatus 33 comprises a communication interface 82, such as a radio frequency (RF) or cellular radio or modem, for permitting the image processing apparatus 33 to communicate with other systems or devices, such as the aircraft 21. The image processing apparatus 33 also has an input interface 84, such as a keyboard or mouse, for enabling a user to provide inputs, and the image processing apparatus 33 also has an output interface 86, such as a display screen or printer, for enabling the image processing apparatus 33 to provide outputs to a user. In some embodiments, the input interface 84 and the output interface 86 may be implemented by the same device, such as a touchscreen, capable of both displaying outputs to a user and receiving inputs from the user.

After receiving the image data 25, the processing logic 72 is configured to store the image data 25 in memory 74 and to process the image data 25 in order to identify emerged plants within an image of the field defined by the data 25. Note that there are various techniques and algorithms that may be used identify emerged plants within an image. Exemplary techniques for identifying emerged plants will now be described in more detail below, but it should be emphasized that other techniques and various modifications to the techniques described below are possible.

For purposes of illustration, it will be assumed that the image data 25 received from the aircraft 21 defines the exemplary composite image 66 shown by FIG. 3, but it is possible for the image data 25 to define other types and numbers or images in other examples. As an example, it is possible for raw images from the optical sensor 15 to be transmitted to the image processing element 33, which could be configured to combine the images into one or more composite images rather than combining the images on board the aircraft 21.

Before attempting to identify emerged plants, the processing logic 72 may perform various processing of the image data 25 in an effort to facilitate plant identification and improve the performance of the image processing apparatus 33. As an example, in some embodiments, the processing logic 72 is configured to apply a sun-angle normalized vegetation index to the pixel color values of the image 66 in an effort to normalize the pixel color values to compensate for sun-angle variation, as shown by block 141 of FIG. 9. In this regard, when an object (e.g., an emerged plant) is illuminated by the sun, the angle of the sun relative to the object slightly affects the color value that is measured by the optical sensor 15 for that object. Thus, due to variation in sun angles, the same pixel of vegetation may be assigned a slightly different color value by the optical sensor 15 depending on the time, date, and geographic location of image capture.

Figure 5:
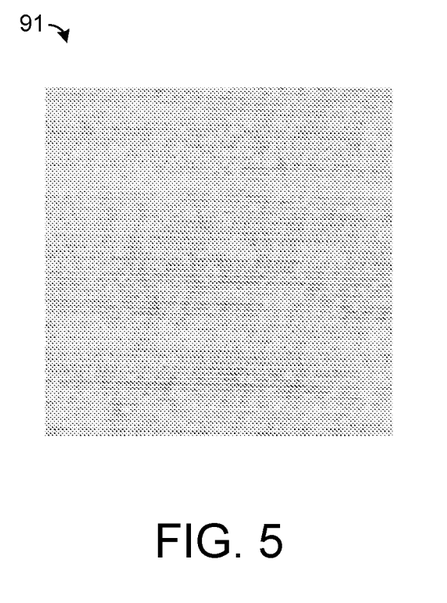
FIG. 5 shows the image of FIG. 3 after a normalization process has been performed to compensate for sun-angle variation.

As shown by FIG. 4, the image processing apparatus 33 is configured to store predefined vegetation index data 88 indicating the appropriate sun-angle normalized vegetation index to be applied by the processing logic 72 depending on the time, date, and geographic location (e.g., latitude and longitude) of image capture. As an example, the processing logic 72 may be configured to determine the time, date, and geographic location of image capture from the metadata associated with the image data 25 by the image capture logic 44, as described above. Using such information, the processing logic 72 may be configured to access the vegetation index data 88 in order to find, interpolate, or otherwise calculate a suitable sun-angle normalized vegetation index to be applied to the pixels of the image 66. Then, the processing logic 72 is configured to apply such vegetation index to the pixel color values defining the image 66 thereby adjusting these color values to compensate for sun-angle variation. FIG. 5 shows an exemplary image 91 defined by the image data 25 after the pixel values have been normalized.

Figure 6:
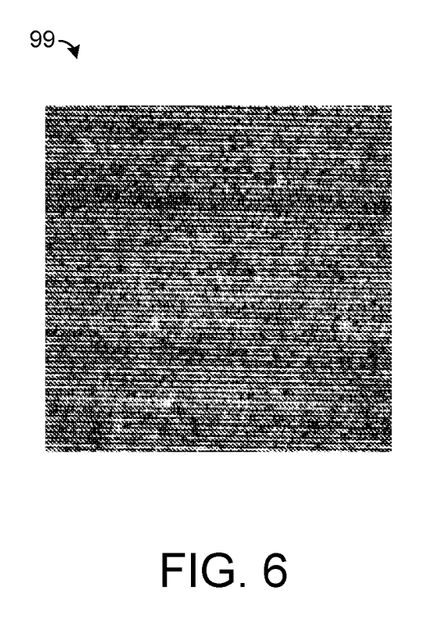
FIG. 6 shows a vegetation map derived from the normalized image of FIG. 5.

After applying the sun-angle normalized vegetation index to the pixel color values and possibly performing other processing as may be desired, the processing logic 72 is configured to analyze the normalized image 91 in order to identify vegetation within the image 91. In this regard, the processing logic 72 defines a vegetation map 99 (FIG. 4) indicating the areas of the image 91 where vegetation is identified, as shown by block 144 of FIG. 9. In particular, the processing logic 72 is configured to compare a predefined threshold, referred to hereafter as "plant material threshold," to each normalized pixel color value of the image 91. This plant material threshold may be empirically determined such that a pixel likely represents an area of vegetation (i.e., plant material) when the threshold is exceeded and likely represents an area of non-vegetation (e.g., soil) when the threshold is not exceeded. If the pixel is determined to represent an area of vegetation, the processing logic 72 is configured to assign a particular color value (e.g., white) to the pixel (referred herein to as a "vegetation pixel") in the vegetation map 99, and if the pixel is determined to represent an area of non-vegetation, the processing logic 72 is configured to assign another color value (e.g., black) to the pixel (referred to herein as "non-vegetation pixel") in the vegetation map 99. If desired, the pixel color values in the vegetation map may be a one bit value where a first value (e.g., "0") is assigned to a vegetation pixel and a second value (e.g., "1") is assigned to a non-vegetation pixel, although other types of values may be used in other embodiments. Thus, each pixel of the vegetation map indicates whether the image processing element 33 has detected vegetation within the geographic area of the field corresponding to the pixel. FIG. 6 depicts an image of an exemplary vegetation map 99 where vegetation pixels are colored white and non-vegetation pixels are colored black.

Figure 9:
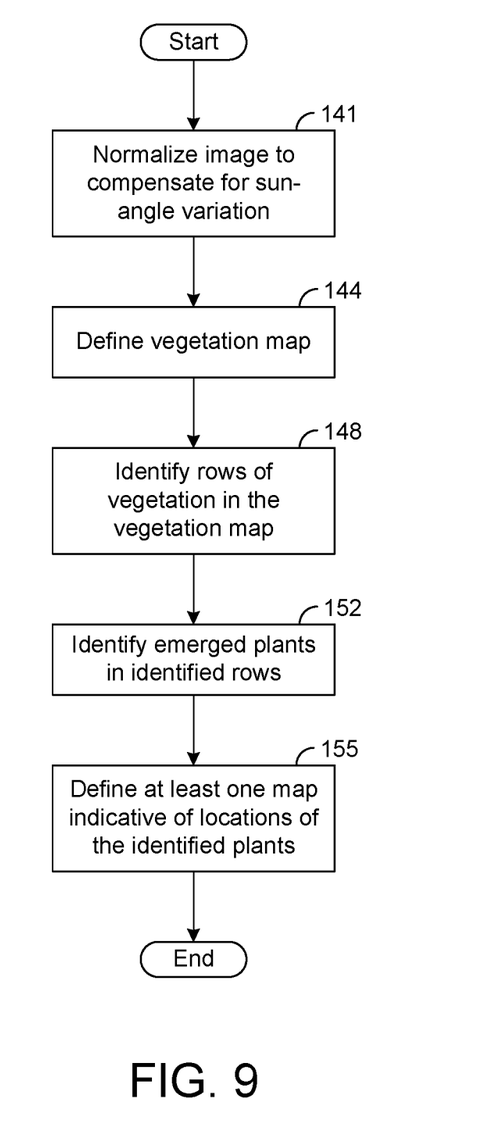
FIG. 9 is a flowchart illustrating an exemplary method of processing image data for identifying emerged plants in the image data and defining a map indicative of locations of the identified plants.

In addition to defining the vegetation map 99, the processing logic 72 is configured to analyze the processed image data 25 in order to identify rows of vegetation within the imagery, as shown by block 148 of FIG. 9. In some embodiments, the processing logic 72 is configured to identify rows vegetation by first determining the approximate angle of the rows (referred to herein as "row angle"), which are generally parallel to one another. To determine the approximate row angle, the processing logic 72 performs one or more transformations on at least a sub-region of the normalized image 91 thereby converting the image sub-region into frequency space via the Fourier Transform in order to facilitate determination of a dominant row angle. In this regard, planted rows of crops typically do not form perfect parallel lines from row-to-row, and the angle of some rows varies along the length of the row. The dominant row angle generally refers to the row angle that best approximates the overall direction of the rows across a wide area. In some embodiments, the processing logic 72 randomly selects a plurality of sub-regions, determines a dominant row angle for each sub-region, and then averages the dominant row angles of the sub-regions to determine a dominant row angle for the overall image 91 to be used by the processing logic 72 to segment the vegetation map 99, as will be described in more detail below.

In addition to determining the dominant row angle, the processing logic 72 analyzes the transformed image to identify two adjacent rows of vegetation. In this regard, the processing logic 72 finds the most prominent row, which is the row that best resembles a row of vegetation along the dominant row angle, and the processing logic 72 also finds the next row that is adjacent to the most prominent row. The processing logic 72 may then measure the distance between the two adjacent rows of vegetation, referred to hereafter as "row separation distance." In general, it may be assumed that rows of the same crop are separated by approximately the same row separation distance. In some embodiments, the row separation distance may be determined by identifying the dominant frequency on the transformed image along the direction perpendicular to the dominant row angle.

After determining the dominant row angle and the row separation distance, the processing logic 72 is configured to segment the vegetation map 99 into a plurality of transverse lines that extend in a direction perpendicular to the dominant row angle and are positioned such that each transverse line should cross at nearly right angles all expected rows of vegetation. In this regard, the processing logic 72 defines a first transverse line that is positioned such that it is perpendicular in space with the most prominent row. Using this transverse line as a reference, the processing logic 72 defines a second transverse line that is parallel to the first transverse line and is separated from the first transverse line by a fixed distance, referred to hereafter as the "transverse spacing distance" or "TSD." For example, this distance can be set as a multiple of the seed spacing (discussed below). In some embodiments it is set to 5 times the seed spacing, but other values for the transverse spacing distance are possible. The second transverse line thus created will cross at nearly right angles all the expected rows of vegetation. Using this same technique and using the second transverse line as a reference, the processing logic 72 may define yet another transverse line ("third transverse line") that is separated from the second transverse line by the same fixed distance. By continuing to define transverse lines in this way, the vegetation map 99 is segmented by a plurality of transverse lines where each transverse line crosses all expected vegetation rows nearly perpendicularly.

Figure 10:
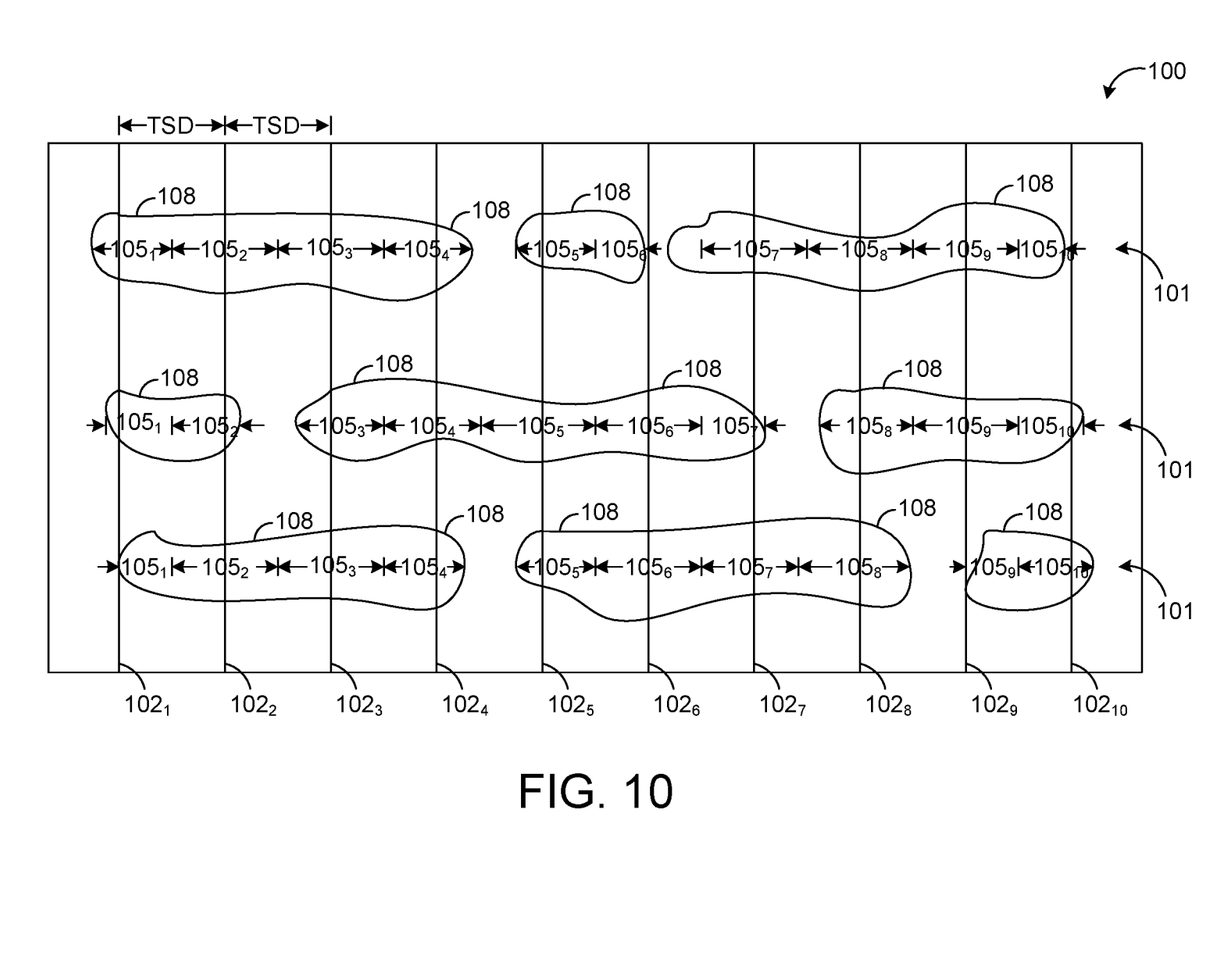
FIG. 10 shows a vegetation map that has been segmented by a plurality of transverse lines.

FIG. 10 depicts an exemplary vegetation map 100 for a plurality of vegetation rows 101, where the map 100 has been segmented by a plurality of transverse lines 102. For simplicity of illustration, the image 100 is shown as having three vegetation rows 101, but the image 100 may have any number of vegetation rows 101 as may be desired. Also for simplicity of illustration, the vegetation rows 101 are enlarged relative to the map 99 shown by FIG. 6, and the map 100 of FIG. 10 corresponds to a smaller field section.

After defining the transverse lines 102, the processing logic 72 traverses the length of each transverse line 102 searching for row segments 105. Row segments 105 may be the small segments of each row 101 that are perpendicular to the transverse line 102, having endpoints within half of the transverse spacing distance on either side of the transverse line being traversed. In this regard, starting at one end of a transverse line 102, the processing logic 72 begins analyzing pixels of the vegetation map 99 along the transverse line looking for vegetation pixels. In other embodiments, other types of row segments may be identified.

Vegetation pixels along the transverse line that occur at similar distances along the transverse line belong to the same row segment 105, and are grouped as such, and may be labelled with the index of the transverse line along which they were detected. Thus, after traversing all transverse lines 102, the multitude of identified row segments 105 will coincide with small pieces 108 of vegetation rows, each piece 108 containing a number of vegetation pixels. These row segments 105 may have been labelled with the index of the transverse line to which they belong. The totality of row segments 105 will together compose all vegetation rows 101, beginning at one end of each vegetation row 101 and ending at the opposite end of the vegetation row 101 assuming that there are no significant gaps in the vegetation row 101. If there are significant gaps in a vegetation row 101, multiple row segments 105 may make up each continuous portion of that vegetation row 101. At this point, the row segments 105 are not grouped in a fashion that allows direct identification of complete vegetation rows 101, as the segments are only labelled by their transverse line index.

After identifying row segments 105 along transverse lines 102, the processing logic 72 is configured to match row segments 105 from nearby transverse lines 102 together in order to identify complete vegetation rows that are each composed of multiple row segments. This matching process begins at one end of the image, for example with the left-most transverse line (transverse line $102_1$). Each row segment $105_1$ (referred to as the "first segment") on this first transverse line $102_1$ is matched in a greedy fashion to the nearest row segment $105_2$ (referred to as the "second segment") in the second-from-left transverse line (transverse line $102_2$), if and only if the second segment $105_2$ is within a specified angular distance from the first segment $105_1$. This angular distance may be measured as the distance between the dominant row angle and the line segment joining the centers of the first and second row segments. The threshold used to allow or reject matches may for example be a fixed number of degrees, for example 10 degrees. This threshold ensures that first and second segments are only matched if they lie in approximately the same line along the dominant row direction. After matching, the first segment $105_1$ is labelled as having been "matched-on-the-right", and the second segment $105_2$ is labelled as having been "matched-on-the-left". The matching process is then repeated, this time drawing first segments from the second-from-left transverse line $102_2$, the second segments from the third-from-left transverse line $102_3$. The matching is repeated for every pair of adjacent transverse lines (i.e., pair of transverse lines $102_1$ and $102_2$, pair of transverse lines $102_2$ and $102_3$, pair of transverse lines $102_3$ and $102_4$, etc.) until the right-most end of the image is reached. Next, the matching process is repeated between all pairs of transverse lines separated by one transverse line (i.e., pair of transverse lines $102_1$ and $102_3$, pair of transverse lines $102_2$ and $102_4$, pair of transverse lines $102_3$ and $102_5$, etc.), but this time, only row segments that have not been previously labelled as matched-on-the-right are selected as first segments, and only row segments that have not been previously been labelled as matched-on-the-left are selected as second segments. This matching process is then repeated further, in some embodiments using all pairs of transverse lines separated by two, and then three, transverse lines.

Finally, the set of all matches that were found constitute a set of connections between row segments that allow individual vegetation rows to be identified. Vegetation rows are identified by selecting a row segment $105_1$ at the left-most edge of the image, and following the matches that were made towards the right, hopping from one row segment to the next. The row segments that are all continuously connected by matches constitute a single vegetation row 101. This identified vegetation row 101 may correspond to a single true vegetation row in the image, which may or may not have short gaps and which may or may not be curved. The matching process as described will match row segments even if they are not necessarily adjacent, which allows for identifying vegetation rows that are discontinuous. Furthermore, the matching process as described will match row segments 105 even if they do not lie on exactly the same line parallel to the dominant row direction, which allows for identification or vegetation rows that are somewhat curved or nonlinear.

For each vegetation row identified in the vegetation map 99, the processing logic 72 is configured to analyze the pixels within the vegetation row in order to identify and count emerged plants within the vegetation row. As shown by block 152 of FIG. 9. To assist the processing logic 72 with identifying emerged plants, a user preferably provides user input, via the input interface 84 (FIG. 4) or otherwise, indicating a nominal seed spacing distance for emerged plants in the field. In this regard, when planting a crop, farmers typically plant each seed in the same row approximately the same distance away from the next adjacent seed depending on the expected size of the plant. In general, the bigger the plant is expected to grow, the further apart is the seed spacing. Thus, the seed spacing input is used to provide a limit for the expected width of a single plant. That is, the width of a single plant is generally expected to be less than (e.g., a fraction of) the seed spacing distance.

In analyzing the row segments, the processing logic 72 is configured to identify sets of contiguous vegetation pixels (also known as connected components), referred to hereafter as "vegetation objects." That is, each vegetation object is defined by a plurality of contiguous vegetation pixels and, therefore, may represent one or more emerged plants, as will be described in more detail below. As an example, the pixels associated with a plurality of contiguous row segments 105 within the same row 101 may define a vegetation object.

Each identified vegetation object is analyzed to determine whether it has dimensions consistent with one or more emerged plants of interest. As an example, the processing logic 72 may determine the area of a vegetation object and compare the area to a predefined threshold, referred to hereafter as the "minimum vegetation threshold." If the minimum vegetation threshold is not exceeded, then the vegetation object is deemed to be too small to constitute an emerged plant of interest. In some embodiments, the minimum vegetation threshold (TH) is defined according to the following formula:

$$TH=(seed\_spacing/4)^2$$

where "seed_spacing" is the seed spacing distance entered by the user. In other embodiments, other values of the minimum vegetation threshold may be used. If the minimum vegetation threshold is exceeded, then the width of the vegetation object is computed and compared to another threshold, referred to hereafter as the "maximum vegetation threshold," which is based on and less than (e.g., a fraction of) the seed spacing distance entered by a user. As an example, the maximum vegetation threshold may be a predefined percentage of the seed spacing distance.

If the minimum vegetation threshold is exceeded and if the maximum vegetation threshold is not exceeded, then the processing logic 72 determines that the vegetation object represents a single emerged plant of interest. However, if the maximum vegetation threshold is exceeded, then the processing logic 72 determines that the vegetation object represents multiple emerged plants of interest depending on the extent to which the maximum vegetation threshold is exceeded. For example, if the maximum vegetation threshold is exceeded by less than twice the maximum vegetation threshold, then the processing logic 72 may determine that the vegetation object represents two plants. In such a scenario, two plants may be positioned close enough to each other such that there is no detectable space between them in the vegetation map 99. Moreover, the longer is the width of the vegetation object, the greater is the number of plants that may be represented by such object.

Figure 7:
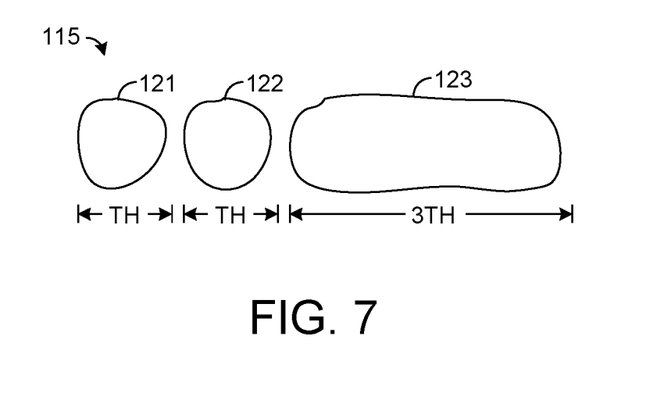
FIG. 7 shows an exemplary row identified by an image processing apparatus, such as is depicted by FIG. 4.

To better illustrate the foregoing, refer to FIG. 7 which shows an exemplary row 115 that includes three vegetation objects 121-123. Assume that each of the vegetation objects 121 and 122 represents a single emerged plant and that vegetation object 223 represents three emerged plants that have grown close enough together such that there is no discernable spacing between the three emerged plants. In such example, the width of each vegetation object 121 and 122 is less than the maximum vegetation threshold (TH), as shown by FIG. 7, such that the processing logic 72 identifies a single emerged plant at the center of the vegetation object 121 and a single emerged plant at the center of the vegetation object 122. However, the width of the vegetation object 123 exceeds the maximum vegetation threshold by greater than a factor of 2 but less than factor of 3. In such case, the processing logic 72 may determine that the vegetation object 123 represents three emerged plants.

In some embodiments, the processing logic 72 is configured to define at least one map indicative of the locations of the identified plants, as shown by block 155 of FIG. 9. As an example, the processing logic 72 may be configured to generate a vector point map 125 (FIG. 4) based on the emerged plants identified from analysis of the vegetation map 99, as described above. The vector point map 125 defines a map of the field imaged by the optical sensor 15 with a vector point defined at each location where an emerged plant is identified. That is, each vector point in the map 125 represents an identified emerged plant, and the location of the vector point in the map 125 corresponds to the plant's location in the field. Thus, the vector point map 125 can be analyzed to determine the number and locations of plants identified within a specific geographic region of the field. The processing logic 72 is configured to use the vector point map 125 to provide any of various outputs that may be useful for managing the crops in the imaged field. As an example, the processing logic 72 may be configured to count the number of identified plants within one or more regions of the field and provide information indicative of the count to a user so that the user can make informed decisions on how to manage such region or regions.

Figure 8:
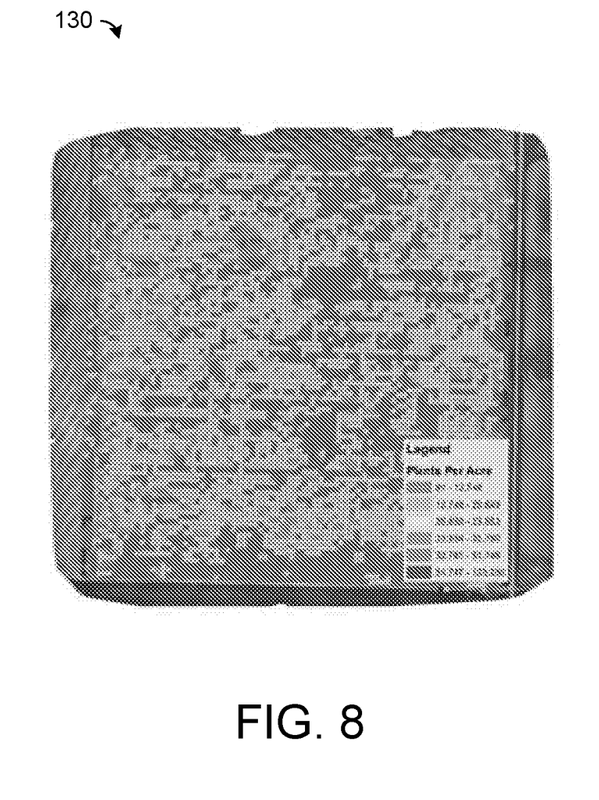
FIG. 8 shows an exemplary as-emerged map.

In some embodiments, the processing logic 72 is configured to generate an as-emerged map 130 based on the vector point map 125. The as-emerged map 130 defines a grid having a plurality of cells arranged in rows and columns with each cell corresponding to a certain geographic region of the field, such as a one acre region of the field. Each cell is color coded or otherwise manipulated in order to indicate the number of emerged plants that have been identified within the corresponding region of the field. FIG. 8 shows an exemplary as-emerged map 130.

To form the as-emerged map 130, the processing logic 72 may be configured to receive user input indicating a desired cell size. That is, the user may provide an input indicating the size of the geographic region to be represented by each cell in the as-emerged map 130. As an example, the user may specify that each cell is to represent one acre of the field or some other cell size desired by the user. The processing logic 72 is configured to rotate the as-emerged map 130 so that the rows of cells are oriented in the same direction as the vegetation rows identified in the vegetation map 99. That is, the processing logic 72 rotates the rows of cells to the dominant row angle. For each cell of the as-emerged map 130, the processing logic 72 is configured to map the cell to a corresponding region of the vector point map 125. That is, the cell represents a certain geographic region of the field, and the processing logic 72 is configured to identify the portion of the vector point map 125 representing the same geographic region of the field. The processing logic 72 then counts the number of vector points representing identified plants within such portion of the vector point map 125, and the processing logic 72 color codes the corresponding cell of the as-emerged map 130 based on such number. Thus, the color of each cell indicates the approximate total number or concentration of identified plants within the geographic region represented by the cell.

If desired, the as-emerged map 130 may have a similar format relative to conventional as-planted maps except that the as-emerged map 130 indicates the number of emerged plants within the cells, not the number of seeds. This may help to make the as-emerged file compatible with existing programs or systems designed to use as-planted maps for crop management decisions or operations.

Similar to as-planted maps, the information provided by the image processing apparatus 33 can be useful to make various crop management decisions, such as controlling fertilization and irrigation. For example, if the as-emerged map 130 indicates that a grid cell corresponding to a particular area of the field is associated with fewer plants per acre than another grid cell, fertilizing and/or watering can be limited over the area containing less plants per acre. Since the as-emerged map 130 identifies plants that have actually emerged from the soil, the as-emerged map 130 is likely to provide a more accurate representation of the actual state of the field than an as-planted map, thereby resulting in better management decisions.

The invention claimed is:

1. A method, comprising:
combining a plurality of images of a field to form a composite image of the field;
analyzing, by a processor device, the composite image to detect areas of vegetation within the composite image;
defining, by the processor device, a vegetation map based on the composite image, the vegetation map having a plurality of pixels corresponding to areas of the field, each of the pixels of the vegetation map indicating whether vegetation is detected by the processor device in a corresponding area of the field;
identifying, by the processor device, rows of vegetation within the vegetation map;
analyzing, by the processor device, each of the identified rows to identify emerged plants within the identified rows, by:
determining a seed spacing within the identified rows;
determining a size of a first plant based on the vegetation map;
based on the seed spacing and the size of the first plant, determining that the first plant is an emerged plant;
determining a size of a second plant based on the vegetation map; and
based on the seed spacing and the size of the second plant, determining that the second plant is not an emerged plant; and
defining, by the processor device, at least one map of the field based on analyzing each of the identified rows, the at least one map indicating locations of the identified emerged plants within the field.

2. The method of claim 1, further comprising:
counting, by the processor device, a number of emerged plants within the identified rows; and
providing an output indicative of the counting.

3. The method of claim 1, further comprising displaying the at least one map.

4. The method of claim 1, further comprising controlling fertilization or watering of the field based on the at least one map.

5. The method of claim 1, wherein analyzing the composite image comprises:
comparing a color value of at least one pixel of the composite image to a predefined threshold; and
determining whether the at least one pixel of the composite image corresponds to an area of vegetation based on the comparing.

6. The method of claim 1, further comprising adjusting color values of the composite image thereby compensating for sun-angle variation.

7. The method of claim 1, further comprising:
identifying, by the processor device, rows of vegetation within the composite image; and
analyzing, by the processor device, the identified rows of vegetation within the composite image to determine a row angle and a row spacing,
wherein identifying the rows of vegetation within the vegetation map is based on the row angle and the row spacing.

8. The method of claim 1, further comprising receiving an input indicative of a seed spacing for emerged plants, wherein the analyzing each of the identified rows is based on the input.

9. The method of claim 8, wherein analyzing each of the identified rows comprises:
identifying a plurality of contiguous vegetation pixels in the vegetation map; and
identifying a plurality of emerged plants within the contiguous vegetation pixels based on the input.

10. A system, comprising:
a memory; and
a processor device coupled to the memory, the processor device configured to:
detect areas of vegetation within image data comprising a composite image of a field;
define a vegetation map having a plurality of pixels corresponding to areas of the field, each of the pixels of the vegetation map indicating whether the processor device detected vegetation in a corresponding area of the field;
identify rows of vegetation within the vegetation map and identify emerged plants within the identified rows, by at least in part:
identifying, based on the image data, a plurality of sub-regions;
determining, based on the sub-regions, an average crop row angle, by:
determining crop row angles of the plurality of sub-regions; and
determining the average crop row angle based on an average of the crop row angles;
determining a primary crop row based in part on the average crop row angle, the primary crop row being a row of vegetation of the rows of vegetation having a crop row angle closest to the average crop row angle;
determining a next crop row that is adjacent the primary crop row; and determining a crop row separation distance between the primary crop row and the next crop row; and define at least one map of the field, wherein the at least one map indicates locations of the identified emerged plants within the field.

11. The system of claim 10, wherein the at least one map is segmented into a plurality of cells, and wherein the at least one map indicates concentrations of the emerged plants within the cells.

12. The system of claim 10, wherein the processor device is further configured to:

count a number of emerged plants within the identified rows; and provide an output indicating a number of emerged plants within at least one area of the field.

13. The system of claim 10, wherein the processor device is configured to compare a color value of at least one pixel of the composite image to a predefined threshold; and determine whether the at least one pixel of the composite image corresponds to an area of vegetation based on a comparison of the color value to the predefined threshold.

14. The system of claim 10, wherein the processor device is configured to:

receive an input indicative of seed spacing for the emerged plants; and identify the emerged plants based on the input.

15. The system of claim 14, wherein the processor device is configured to identify a plurality of contiguous vegetation pixels in the vegetation map and to identify a plurality of emerged plants within the contiguous vegetation pixels based on the input.

16. A method, comprising:

analyzing, by a processor device, color values of an image of a field;

detecting, by the processor device, areas of vegetation within the image based on the analyzing the color values;

defining, by the processor device, a vegetation map based on the detecting, the vegetation map having a plurality of pixels corresponding to areas of the field, each of the pixels of the vegetation map indicating whether vegetation is detected by the processor device in a corresponding area of the field, each pixel being identified as either a vegetation pixel or a non-vegetation pixel, each pixel identified as a vegetation pixel being assigned a same vegetation value, and each pixel identified as a non-vegetation pixel being assigned a same non-vegetation value;

identifying, by the processor device, emerged plants in the field based on the vegetation map; and defining, by the processor device, at least one map of the field based on the identifying, the at least one map indicating a number of the identified emerged plants within a geographic region of the field.

17. The method of claim 16, wherein analyzing the color values comprises comparing the color values to a predefined threshold.

18. The method of claim 16, further comprising receiving an input indicative of a seed spacing for the emerged plants, wherein the identifying is based on the input.

19. The method of claim 16, wherein the at least one map is segmented into a plurality of cells, and wherein the at least one map indicates a number of the identified emerged plants within at least one of the cells.

20. The method of claim 16, further comprising:

identifying, by the processor device, rows of vegetation within the image; and analyzing, by the processor device, the identified rows to determine a row angle of the rows and a row spacing between the rows.

21. The method of claim 20, further comprising:

segmenting, by the processor device, the vegetation map into row segments based on the row angle and the row spacing; and analyzing, by the processor device, the row segments, wherein the identifying the rows of vegetation is based on analyzing the row segments.

22. The method of claim 21, further comprising transforming, by the processor device, the image into Fourier Space, wherein identifying the rows of vegetation is based on the transforming.

* * * * *